United States Patent [19]

Bodine

[11] 4,096,762

[45] Jun. 27, 1978

[54] TORSIONAL SONIC OSCILLATOR EMPLOYING UNIVERSAL JOINTS AND TANDEM ARRANGED OSCILLATOR ROTORS

[76] Inventor: Albert G. Bodine, 7877 Woodley Ave., Van Nuys, Calif. 91406

[21] Appl. No.: 710,317

[22] Filed: Jul. 30, 1976

[51] Int. Cl.$^2$ .................................................. F16H 33/00
[52] U.S. Cl. ............................................................ 74/61
[58] Field of Search ............................. 74/61; 64/18, 6

[56] References Cited

U.S. PATENT DOCUMENTS

| | | | |
|---|---|---|---|
| 379,030 | 3/1888 | Robes | 64/6 |
| 1,672,885 | 6/1928 | Goldschmidt | 74/61 |
| 3,209,525 | 10/1965 | Karlsson | 74/61 |
| 3,908,398 | 9/1975 | Braunberger | 64/6 |
| 3,940,946 | 3/1976 | Andersen | 64/6 |

FOREIGN PATENT DOCUMENTS

| | | | |
|---|---|---|---|
| 1,131,189 | 10/1956 | France | 74/61 |

*Primary Examiner*—Benjamin W. Wyche
*Assistant Examiner*—Wesley S. Ratliff, Jr.
*Attorney, Agent, or Firm*—Edward A. Sokolski

[57] ABSTRACT

Paired unbalanced weight oscillator rotors are mounted in a drill stem or the like arranged in tandem and in symmetrical relationship, equally and oppositely off-centered from the longitudinal axis of the stem. The upper element is connected to a rotary drive shaft by means of a universal joint, the rotors being connected to each other by a similar such universal joint. In this manner, the rotors are synchronously driven to provide torsional vibration of the drill stem in which they are mounted without the need for gears and without the size limitations imposed on the oscillator rotors as in prior art systems where such units are arranged side by side.

11 Claims, 2 Drawing Figures

TORSIONAL SONIC OSCILLATOR EMPLOYING UNIVERSAL JOINTS AND TANDEM ARRANGED OSCILLATOR ROTORS

In my U.S. Pat. No. 3,633,688, a drill employing torsional elastic vibration is described which is particularly suitable for drilling through rock. In this drill, a pair of eccentric weight oscillator rotors are mounted in the drill stem in side by side relationship and symmetrically arranged with respect to the center line of the stem. These two oscillator rotors are driven in the same direction by means of a drive motor which is coupled to the oscillator drive shafts by a set of gears. The two rotors are phased with regard to each other at a 180° phase difference, such that the two individual weight forces are additive as a periodic circumferential torque couple, but are subtractive and cancel out insofar as radial force components are concerned.

The device of my prior patent has been found to provide highly efficient drilling action. However, certain shortcomings for particular applications have appeared which the present invention obviates. First, the use of gears presents a lubrication problem, particularly in a mud environment and deep below the surface where the sealing of the gear casing is difficult to maintain. This is as compared with the present invention where only water (generally available in the well bore) is required for lubrication of the universal joints and no seals are needed. Secondly, the arrangement in the prior art of the oscillator rotors side by side places limitations on the diameters of these elements. In the present invention, by placing the oscillator rotors in tandem, it is possible to utilize greater diameter oscillator units for any given diameter drill stem.

It is therefore an object of this invention to obviate the need for gearing in a torsional sonic oscillator utilizing paired oscillator rotors.

It is a further object of this invention to provide an improved torsional oscillator utilizing paired oscillator rotors arranged in tandem and connected to each other and to the oscillator drive shaft by means of universal joints.

It is still a further object of this invention to enable the use of wider diameter oscillator rotors for a given diameter drill stem in a torsional sonic oscillator utilizing paired oscillator rotors.

Figure 1:
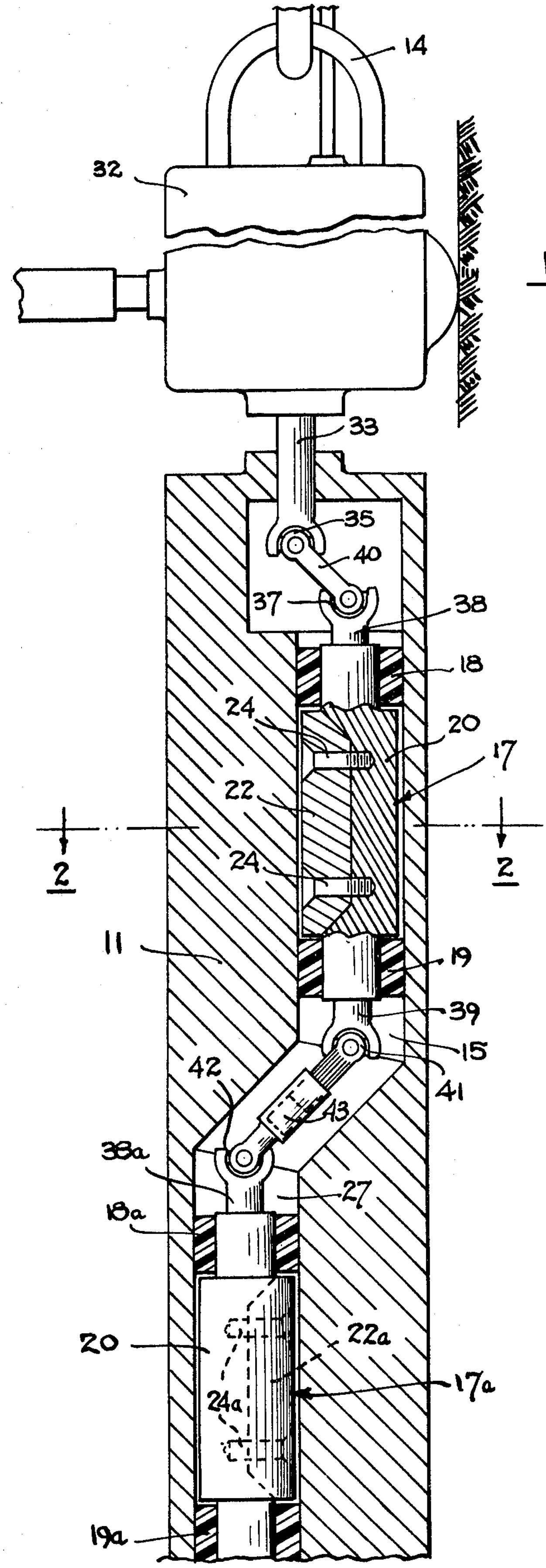
Figure 2:
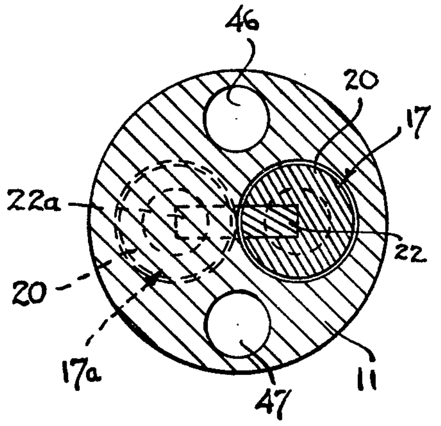

Other objects of this invention will become apparent as the description proceeds in connection with the accompanying drawings, of which:

FIG. 1 is a cross-sectional view illustrating a preferred embodiment of the invention; and FIG. 2 is a cross-sectional view taken along the plane indicated by 2—2 in FIG. 1.

Briefly described, the device of the invention is as follows: A pair of similar eccentrically weighted rotors are mounted for rotation in a drill stem in tandem relationship to each other. The rotors are coupled to each other by means of universal joints, the upper rotor being coupled to the oscillator drive shaft by still another set of universal joints. The eccentrically weighted rotors are mounted on opposite sides of the drill stem in symmetrical balanced fashion with their longitudinal axes displaced from the longitudinal axis of the stem equally but oppositely, the eccentrically weighted portions thereof being positioned in 180° phase relationship with each other.

Rotational drive of the rotors results in torsional vibration of the drill stem with radial vibrational forces being cancelled out.

Referring now to the drawings, a preferred embodiment of the invention is illustrated. Drill stem 11 is suspended in a well or the like by means of a suspension hook 14. The lower end of the stem (not shown) may have a cutting tool thereon for drilling into earthen material, rock, and the like, as shown for example in my aforementioned U.S. Pat. No. 3,633,688. Rotatably mounted in cavity 15 formed in drill stem 11 is first oscillator rotor 17 which is cylindrical. Rotor 17 is rotatably supported on cylindrical bearings 18 and 19 which are fixedly attached to stem 11. Oscillator rotor 17 is formed from a first portion 20 which is of a heavier material such as steel, and a second portion 22 which is of a lighter material such as aluminum. Heavier portion 20 constitutes the main portion of the rotor and has a section thereof machined away into which lighter portion 22 is fitted and attached to main portion 20 by means of machine bolts 24. Bearings 18 and 19 are preferably of a material which can readily be lubricated with water, such as linen Micarta.

A second oscillator rotor **17*a* is mounted for rotation in cavity 27 formed in the drill stem. The second oscillator unit 17*a* is identical in its configuration, size and weight, to oscillator rotor 17, and like parts thereof have been given the same numerals as for rotor 17** but with the letter "*a*" added thereto. Second oscillator rotor **17*a* is mounted for rotation on linen Micarta bearings 18*a* and 19*a*. Oscillator rotors 17 and 17*a* are positioned in the stem with their longitudinal axes displaced from the longitudinal axis of the stem equally but oppositely. The two oscillator rotors are phased so that rotor portions 22 and 22*a* and rotor portions 20 and 20*a*** are in 180° phase relationships respectively.

Motor 32 which may be an electric motor or a mud turbine rotatably drives shaft 33. Coupled to shaft 33 is universal joint 35. Universal joint 37 is coupled to the drive shaft 38 of rotor unit 17, with shaft 40 interconnecting universal joints 35 and 37. The output drive shaft 39 of rotor unit 17 is coupled to universal joint 41. Universal joint 42 is coupled to the input drive shaft **38*a* of oscillator rotor 17*a*, shaft 43 interconnecting universal joints 41 and 42. A pair of passageways 46 and 47 (see FIG. 2) may be provided in stem 11 to permit the passage of drill mud to the drill bit region for flushing cuttings away from the bit in the usual manner. It is to be noted that universal joints 35 and 37 can be eliminated if it is feasible to position drive shaft 33 in line with rotor shaft 38 and displaced from the central axis of stem 11**.

The type of interconnecting universal joints and drive shafts shown here are merely to illustrate one form of drive linkage to provide power flow between the essentially off-set rotors. There are many other suitable types of sell-known rotary transmission linkages, such as flexible shafts, spherical splines, connecting rods and discs, etc., which are intended to transmit rotation between misaligned rotating members.

Thus, as can be seen, a plurality of oscillator rotors can be coupled to each other without the need for gearing. The universal joints make it possible for the rotors to be set in tandem relative to each other with rotation from the top being delivered down through the total system so that all of the oscillator rotors turn in the same direction. The heavier weight portions of the paired oscillator rotors, as already noted, are phased with each other in a 180° phase relationship so as to produce torsional vibration in the drill stem while radial vibrational components are cancelled out. A number of pairs of oscillator pairs can be used along the drill stem, all of these being synchronously driven in tandem as has just been described. It should be apparent that with the present invention, larger diameter oscillator units can be utilized with a given diameter stem than in the prior art devices having such units side by side. Further, the elimination of the need for gearing obviates the serious lubrication problems often encountered where gear casings become submerged in water and mud, particularly in relatively deep wells.

While the invention has been described and illustrated in detail, it is to be clearly understood that this is intended by way of illustration and example only and is not to be taken by way of limitation, the spirit and scope of this invention being limited only by the terms of the following claims.

I claim:

1. A torsional sonic oscillator for generating torsional vibration in a torsionally elastic member comprising:

a first eccentrically weighted rotor unit mounted for rotation on said elastic member, a second eccentrically weighted rotor unit, similar in size, weight and configuration to said first rotor unit, mounted for rotation on said elastic member in tandem series driven relationship with said first rotor unit, said rotor units being rotatably mounted on the elastic member with their rotation axes substantially parallel to each other and each displaced from a central axis of said elastic member equally but oppositely in a non-aligned relationship with each other, the eccentrically weighted portions of said rotor units being in 180° phase relationship with each other, linkage means for coupling said rotor units to each other, and drive means for rotatably driving said rotor units.

2. The oscillator of claim 1 wherein said linkage means comprises universal joint means.

3. The oscillator of claim 2 and further comprising second universal joint means for coupling said drive means to one of said rotor units.

4. The oscillator of claim 2 wherein said universal joint means comprises a shaft, a first universal joint connecting one end of said shaft to an end of said first rotor unit and a second universal joint connecting the other end of said shaft to an end of said second rotor unit.

5. The oscillator of claim 1 wherein each of said rotor units is cylindrical and comprises a first portion of a first material and a second portion of a second material lighter than said first material.

6. The oscillator of claim 1 wherein said rotor units are rotatably driven about their longitudinal axes, said longitudinal axes being parallel to each other and to the longitudinal axis of said elastic member, said central axis of said elastic member being the longitudinal axis thereof.

7. The oscillator of claim 6 wherein said torsional elastic member comprises a drill stem having longitudinal cavities formed therein, said rotor units being mounted in said cavities.

8. In combination, a stem member having cavities formed therein, first and second eccentrically weighted rotor units rotatably mounted longitudinally in tandem in said cavities, the rotation axes of said rotors being parallel to each other and to the longitudinal axis of said stem member, said rotor units being substantially identical and being arranged in symmetrical relationship equally and oppositely off-centered from the longitudinal axis of the stem member, the eccentrically weighted portions of the rotors being in 180° phase relationship with each other, first universal joint means for interconnecting said rotor units, drive means for rotatably driving said rotor units, and second universal joint means for interconnecting said drive means and one of said rotor units.

9. The combination of claim 8 wherein each of said rotor units is cylindrical and comprises a first longitudinal portion of a first material and a second longitudinal portion of a second material lighter than the first material, thereby creating a weight unbalance in each of said rotors about the respective rotation axes thereof.

10. The combination of claim 8 wherein each of said universal joint means comprises a shaft and a universal joint connected to each end of said shaft.

11. A torsional sonic oscillator for generating torsional vibration in a torsionally elastic member comprising:

a first eccentrically weighted rotor unit rotatably mounted on said elastic member, a second eccentrically weighted rotor unit rotatably mounted on said elastic member in tandem series driven relationship with said first unit, linkage means for coupling said rotor units together in tandem relationship, and drive means for rotatably driving said rotor units, said rotor units being mounted on said elastic member with their rotation axes substantially parallel to each other and displaced from the central axis of the elastic member in a non-aligned relationship with each other, the eccentric weighting of said rotor units, the displacement of said rotor units from said central axis and the phasing between the eccentric weighting of said rotor units being such that the radial forces generated when the rotor units are rotated neutralize each other and the torsional forces so generated are additive.

* * * * *